United States Patent [19]

Huisinga

[11] 4,381,732
[45] May 3, 1983

[54] POULTRY NEST

[76] Inventor: Theodore G. Huisinga, Rte. 4, Willmar, Minn. 56201

[21] Appl. No.: 319,584

[22] Filed: Nov. 9, 1981

[51] Int. Cl.³ .................... A01K 31/14; A01K 31/16
[52] U.S. Cl. .................................... 119/45 R; 119/48
[58] Field of Search .............................. 119/45 R, 48

[56] References Cited

U.S. PATENT DOCUMENTS 2,621,627 12/1952 Miles ................................. 119/45 R
4,188,911 2/1980 Rafaely ................................. 119/48

Primary Examiner—Hugh R. Chamblee
Attorney, Agent, or Firm—Peterson, Palmatier, Sturm, Sjoquist & Baker, Ltd.

[57] ABSTRACT

A poultry nest and egg collecting apparatus of improved reliability with respect to maintaining the sterility of the shells of eggs which includes a nesting chamber having an open front and a lower nesting surface that is provided with a rearwardly facing egg discharging portion at a higher level than the open front of the nest and is configured to provide a receptacle for receiving and maintaining suitably treated litter of nesting material to improve the sterile characteristics of the nesting environment.

7 Claims, 5 Drawing Figures

U.S. Patent  May 3, 1983  Sheet 1 of 2  4,381,732
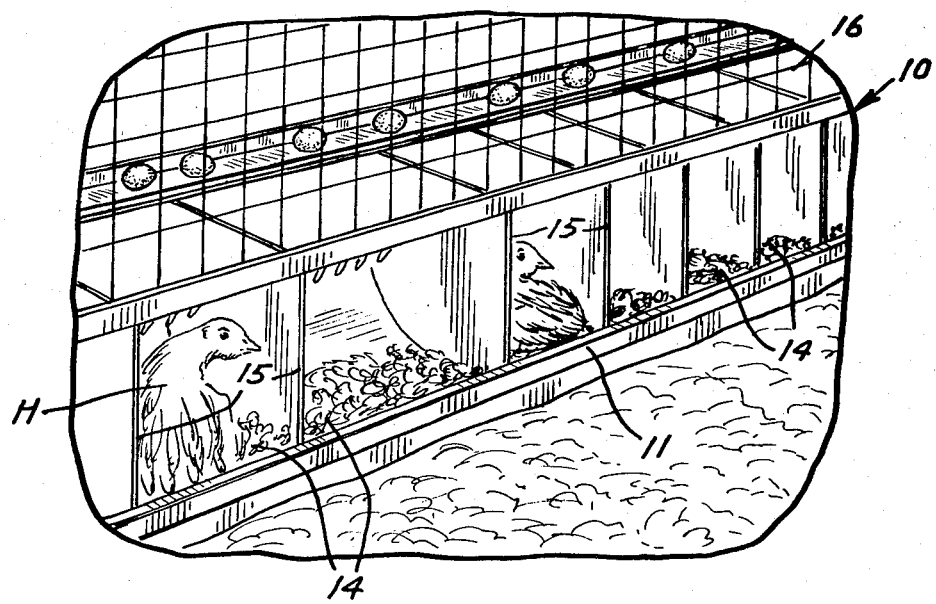
FIG. 1
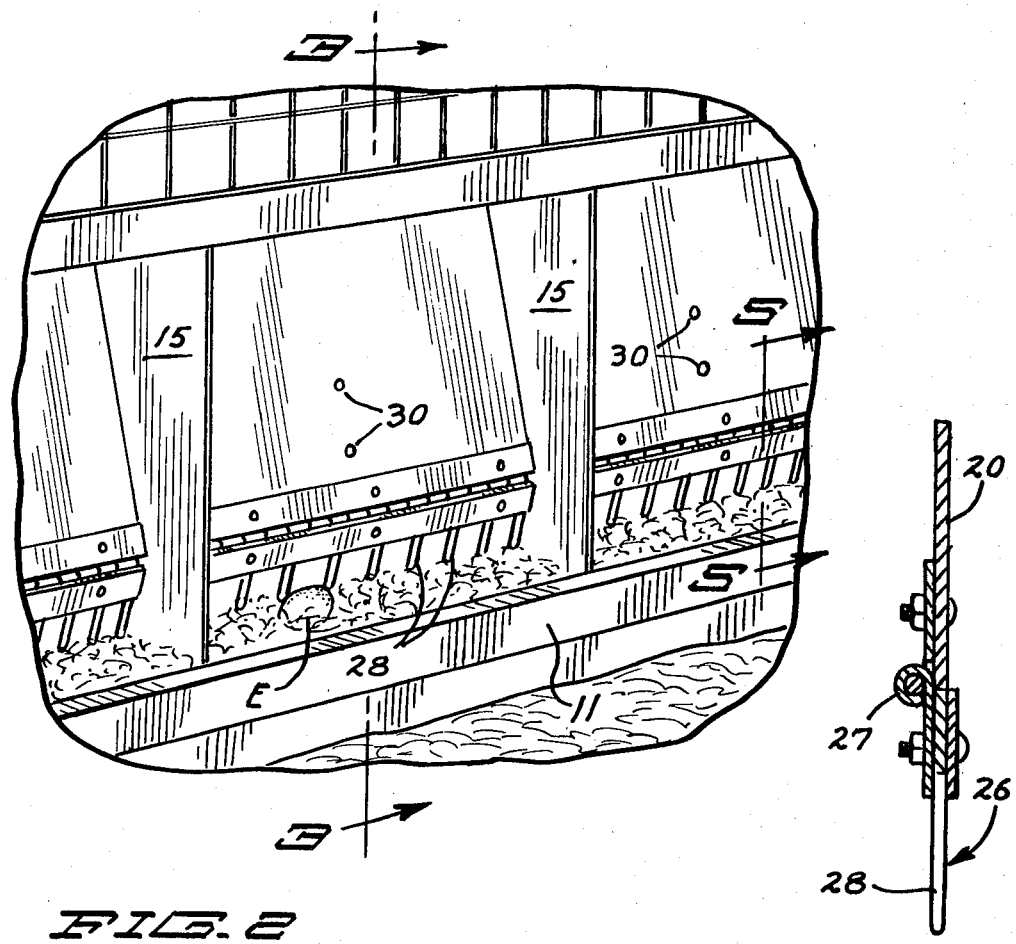
FIG. 2
FIG. 3

POULTRY NEST

This invention relates to a poultry nest and egg collecting apparatus therefore.

BACKGROUND OF THE INVENTION

It is common practice to provide small enclosures or nests for poultry hens to lay their eggs in. Each hen will occupy the nest only for a short period of time during the actual laying of the egg, and when the hen has completed laying the egg, the hen will leave the nest.

Historically it has been common practice to remove the eggs from the nests by hand several times a day. In recent years the eggs have been automatically collected from the nests in various ways. The Rigterrink U.S. Pat. No. 3,164,129 discloses poultry nests from which the eggs will roll by gravity down to a conveyor belt at the rear of the nest for carrying the eggs to a central collecting station. The Peterson U.S. Pat. No. 3,027,871 discloses a swinging panel which pushes the hen off the nest, and then on the backstroke urges the eggs downwardly along the inclined bottom of the nest and onto the collecting shelf.

The Rafaely U.S. Pat. No. 4,188,911 also uses a swinging panel to urge the hen off the nest and has an articulated panel at its lower edge for passing over the eggs as the panel swings in one direction and then ejects the eggs onto a collecting shelf when the panel is swung in the second direction.

It has been determined that as a hen lays an egg, the egg is sterile as it emerges from the oviduct, and has a temperature of about 105° F. As the egg is deposited in the nest, the egg commences cooling and contracting, and because the nesting material in the bottom of the nest contains many contaminants, these contaminants are immediately pulled into the egg and cannot thereafter be removed. It is for this reason that it is desirable to remove the eggs from the nest soon after they are laid so that processing of the eggs may be commenced soon after they are laid.

The most common contaminants include E-Coli, Pseudomonas, Salmonella, and Staphylococcus.

SUMMARY OF THE INVENTION

An object of the invention is to provide a new and improved poultry nest and egg collecting apparatus therefore of simple and inexpensive construction and operation.

Another object of the invention is the provision of a novel poultry nest and egg collecting apparatus therefore which will maintain the sterility of the eggs from the time they are laid as to avoid collecting contaminants on the eggs.

A feature of the present invention is the provision of an enclosure defining a poultry nest with an access opening at the front of the enclosure to permit a hen to enter and leave the nest, and an egg collecting media at the rear of the nest for receiving collected eggs and carrying them to a central location. The nest has a smooth and arcuately curved bottom panel along which a pusher panel swings to urge the hen off of the nest. The pusher panel has a plastic comb swingably mounted on its lower edge and provided with plastic fingers or teeth which are stiff but somewhat flexible. The plastic comb may tilt with respect to the pusher panel to pass over the eggs on the nest during forward swinging of the pusher panel; and on rearward swinging of the pusher panel, the plastic fingers of the comb carry the eggs upwardly along the arcuately curved bottom of the nest for delivering the eggs to the collecting station at the rear of the nest. The fingers of the plastic comb are sufficiently stiff and close enough together as to convey an egg upwardly along the arcuately curved bottom panel, but are sufficiently flexible as to flex and pass by an egg if for any reason the egg encounters some obstruction in the nest.

Another very important feature of the present invention is that the litter or nesting material in the bottom of the nest is a loose granular or similar material, including a quantity of disinfectant such as Formaldegen powder which is a derivative of formaldehyde and which liberates formaldehyde gas over an extended period at room temperature. Formaldegen is a trademark of Vineland Laboratories of Vineland, N.J. and contains only paraformaldehyde as the active ingredient. The Formaldegen in the litter keeps the litter nearly sterile so that eggs deposited on the litter in the bottom of the nest are maintained in the sterile condition which is especially important for eggs which are to be hatched. It has been found that the Formaldegen, which emits a gas for accomplishing the disinfecting, remains sterile in the litter of the nest for up to three weeks.

The litter used in the nest may have a depth of one and a half inches and should have the approximate consistency of whole oats. Various materials may be used. For instance equal quantities of mixed pea gravel and rice hulls provides a satisfactory litter; sawdust has also been used successfully. During each cycle of operation of the pusher panel and the plastic comb, the fingers of the comb will pass through the litter and close to the arcuate panel at the bottom of the nest to assure that the litter stays loose, exposed to air, and fresh.

The nest and egg collecting apparatus has the advantage of maintaining the eggs sterile as possible during the laying and collecting process. Especially for eggs that are to be hatched into chicks, regardless of whether the poultry is chickens or turkeys, healthier chicks are produced from eggs which are free of contaminants. The litter in the bottom of the nest as well as the upper arcuate portions of the bottom panel are maintained in the sterile condition by the disinfectant contained in the litter material. The breakage of eggs is also minimized by the arcuately rounded bottom panel of the nest along which the eggs are moved by the plastic fingers which travel arcuately along the bottom panel and through the litter.

BRIEF DESCRIPTION OF DRAWINGS

FIG. 1 is a perspective view showing a number of poultry nests, some of which have turkey hens in them.

FIG. 2 is an enlarged perspective view of the nest with the pusher panels being swing forward while the plastic comb is passing over the top of one of the eggs.

FIG. 5 is an enlarged detail section view taken approximately at 5—5 in FIG. 2.

DETAIL DESCRIPTION

Figure 3:
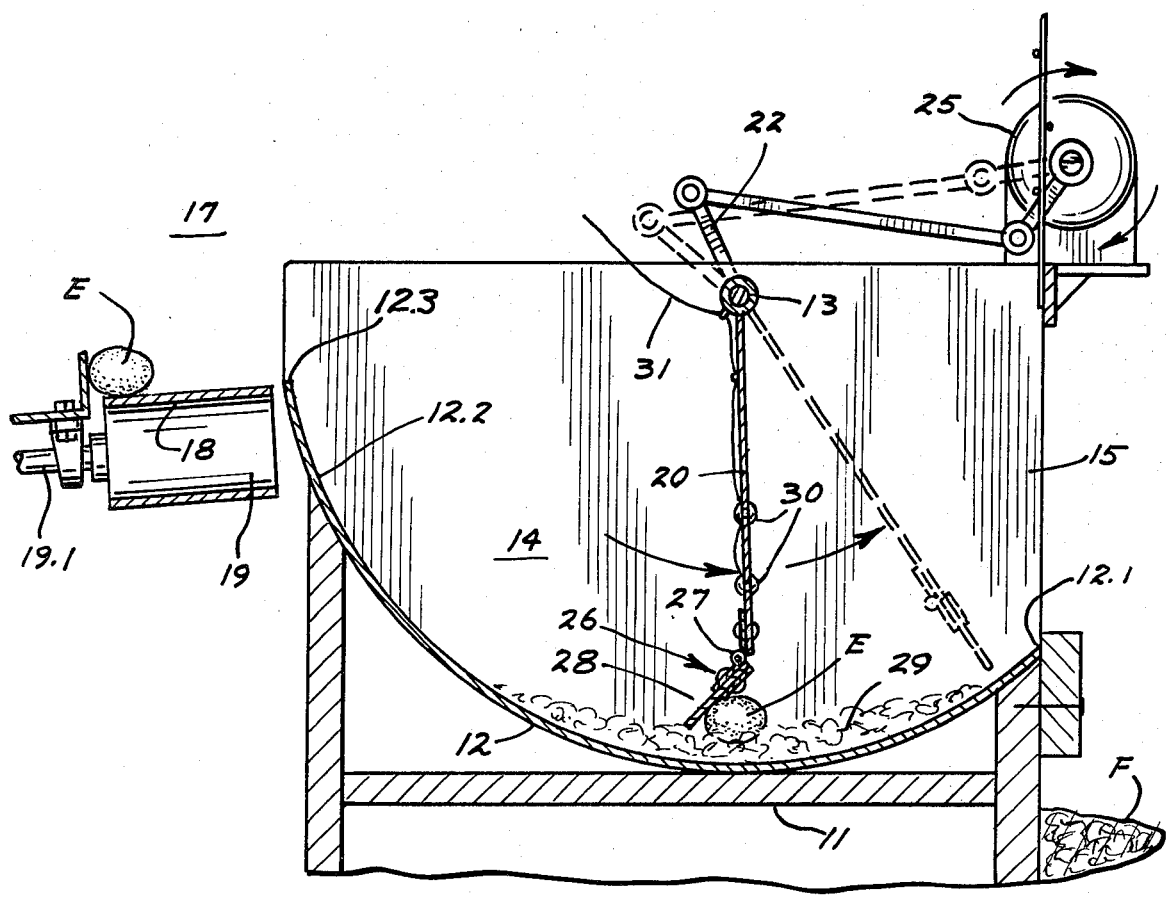
FIG. 3 is a detail section view taken approximately at 3—3 of FIG. 2.

One form of the invention is illustrated in the drawings and is described herein. The poultry nests are indicated in general by numeral 10, and in most instances, the poultry nests are arranged in a long bank of nests, and disposed closely adjacent the floor F of the poultry house in which the nests are enclosed. A suitable framework 11 is provided for the nests. Each of the nests has a bottom panel 12 which has a smoothly rounded, arcuately curved, upwardly facing concave shape. The shape of the bottom panel 12 is partially cylindrical, on an arc formed about the center of a rotary drive rod 13. The bottom panel 12 extends along the whole row of nests as seen in FIGS. 1 and 2 and forms the bottom of each of the enclosures 14, each of which defines an individual nest. Each of the enclosures is separated from an adjacent enclosure by upright stationary walls 15, the front edges of which cooperate with the front edge 12.1 of the bottom panel 12 to define an open front of the enclosure. Immediately above the open front of the row of nests 10 is a woven wire fence or other obstruction 16 so as to confine the hen turkeys in the vicinity of the fronts of the nests 10 and preventing the hens from having access to the work spaces 17 at the rear of the nests.

Figure 4:
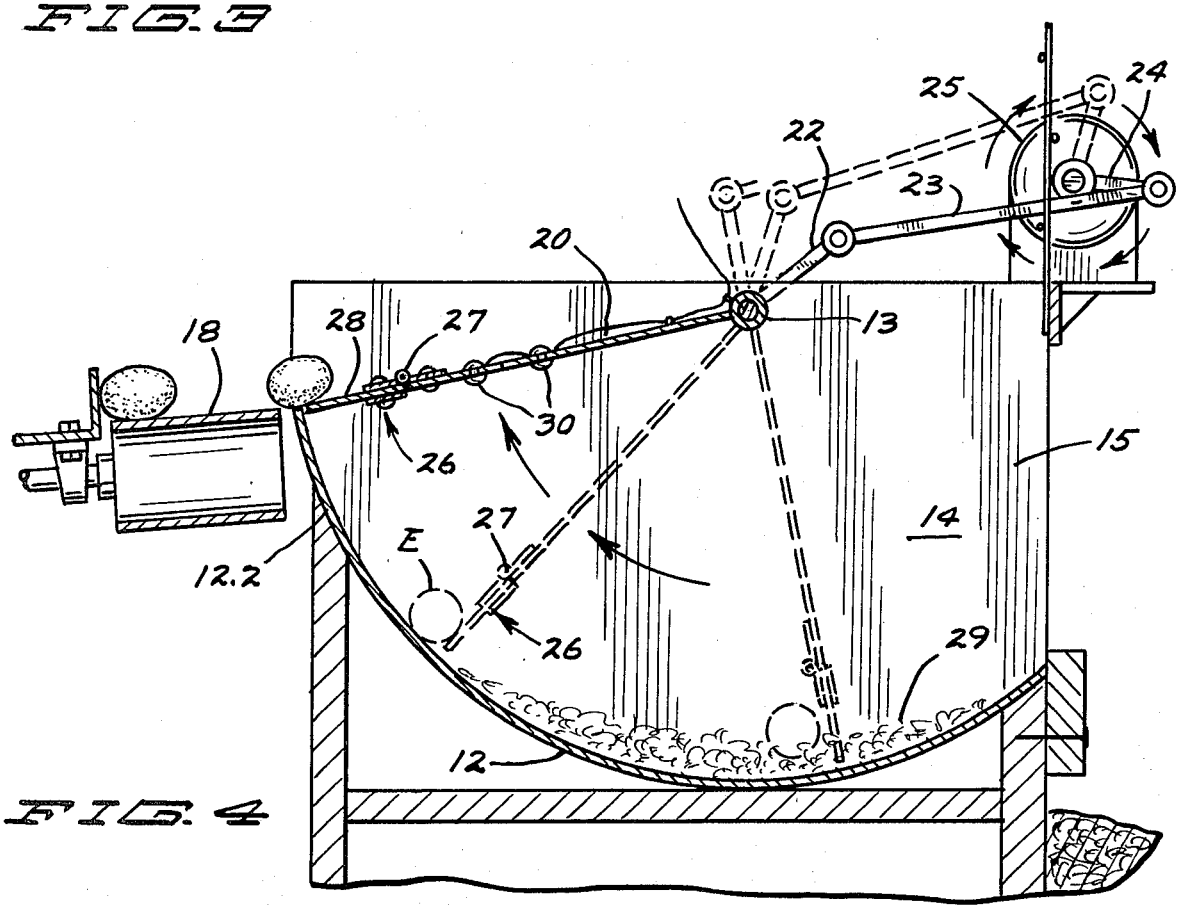
FIG. 4 is a detail section view like FIG. 3, but with the pusher panel and plastic comb shown in alternate positions.

It will be recognized in FIGS. 3 and 4, that the rear portion 12.2 of the arcuately curved bottom panel 12 is steeply inclined, and that the rear edge 12.3 of the bottom panel 12 cooperates with the divider walls 15 in defining an open rear of the nest through which eggs E may be delivered onto an egg collecting belt 18 which extends entirely along the row of nests 10 and is powered by suitable rollers 19 and drive shaft 19.1.

The rotatable drive rod 13 extends all along the row of nests 10 and through each of the enclosures 14. The rotary drive rod 13 is carried in bearing apertures in the divider walls 15.

A plurality of swingable pusher panels 20, each disposed in one of the enclosures 14, are all affixed onto the rotary drive rod 13. The pusher panels 20 extend radially from the rod 13 into close proximity with the upper concave surface of the arcuately curved bottom panel 12.

A crank arm 22 is affixed to one end of the rotary drive rod 13, and the crank arm is connected by an oscillating link 23 to a rotary crank 24 on a drive motor 25. The motor 25, incorporating suitable speed reducing gearing, will produce a periodic single revolution of the crank arm 24 as to swing the panel 20 from its stationery position seen in full lines in FIG. 4 forwardly through the enclosure 14 to the open front thereof for pushing the hens H off the nest, and then swing the panel 20 rearwardly to pick up and move eggs across the bottom arcuate panel 12 and delivering the eggs onto the collecting belt 18.

Each of the pusher panels 20 has a lower portion defining a plastic comb 26 hinged at 27 to the main portion of panel 20. The plastic comb is normally maintained, as relates to the panel 20 in the position illustrated in FIGS. 4 and 5, and from that position, the plastic comb may tilt rearwardly, or in a clockwise direction, but is prevented from tilting forwardly or counterclockwise.

The plastic comb 26 on each of the panels 20 has a multiplicity of stiff but yieldably flexible plastic teeth 28 having significant spacing therebetween, which is somewhat less than the smallest dimension of the eggs E being laid and collected in the nest. On the forward stroke of the panel 20 as seen in FIG. 3, the plastic comb with its fingers 28, will tilt and pass over the top of an egg in the bottom of the nest so that panel 20 can be swung entirely to the front edge of the bottom panel 12 to fully eject the hen from the nest. When the panel 20 is swung rearwardly as seen in FIG. 4, the fingers 28 of the comb will engage any eggs E lying in the bottom of the nest and will carry them along the arcuately curved bottom panel and up over the rear edge 12.3 for delivering the eggs onto the collecting conveyor 18.

An important aspect of the present invention is the provision of the loose litter 29 in the bottom of the enclosure and on the arcuately curved bottom panel 12. The loose litter may be any of a number of different types of material, but should be a free flowing particulate material with particles about the consistency and size of whole oats. A mixture of pea gravel and rice hulls in substantially equal proportions provides a satisfactory litter and the litter is placed about one and a half inches deep in the nest. Other materials may be substituted, for instance sawdust may be used in place of rice hulls, and other fibrous materials. It is significant that the litter 29 must contain a disinfectant, and it has been found that Formaldegen, a derivative of formaldehyde, in powder form provides a satisfactory result when mixed with the loose litter 29. The Formaldegen has the effect of emitting a gas and maintains its effect for up to three weeks in the nest before the litter needs to be replaced along with the Formaldegen. When the hens H lay their eggs in the litter 29 in the bottom of the nest, the eggs maintain their original sterility because of the disinfectant in the litter and the common contaminants which are usually collected on the surface of the eggs immediately, such as the E-Coli, pseudamonas, salmonella, and staphylococcus, are completely eliminated from the nest and are therefore not collected on the surface of the eggs as laid.

It will be recognized that as the plastic comb 26 periodically traverses the arcuately curved bottom panel 12, the fingers 28 sweep through the litter 29 and stir the litter, exposing all of the litter to air. Simultaneously, the fingers engage and push the eggs over the litter and upwardly along the steeply inclined rear portion of the arcuate panel 12 and over the rear edge thereof. Of course as the comb 26 sweeps through the litter 29 and carries the eggs upwardly along the panel 12, small quantities of dust from the litter will be carried along the surface of the panel so that the entire top surface of the arcuately curved metal panel 12 is disinfected so that no portion of the interior of the enclosure or nest will cause contamination of the eggs.

The panels 20 are each provided with a pair of electrodes 30 on the front face thereof. An electric charge is applied to the electrodes by the wire 31 from a power source. During forward swinging of the panel 20, the electrodes 30 are charged so as to touch the hens H and encourage the hen to move quickly off the nest.

In operation, the motor 25 is actuated periodically, such as at the end of thirty minutes, as to swing the panel 20 from its rest position seen in full lines in FIG. 4 forwardly through the enclosure and then back again as indicated. The forward movement is coordinated with charging the electrodes 30 so as to push and urge the hen H off the nest and through the open front of the enclosure out onto the ground in the aisle in front of the nest. During the forward swinging of the panel, the comb 20 tilts as indicated in the full line position in FIG. 3 so as to pass over any eggs laying in the bottom of the nest. When the panel 20 is swung rearwardly as indicated in FIG. 4, the fingers 28 sweep through the loose litter containing the formaldegen, and any eggs lying on or in the litter will be pushed rearwardly along the litter and then upwardly along the steeply inclined rear portion 12.2 of the bottom panel. As the eggs emerge from the litter in the bottom of the nest, any particles of litter will fall back into the bottom of the nest as the eggs move upwardly along the steeply inclined rear portion 12.2. The eggs are maintained in sterile condition while they lie on the loose litter containing the disinfectant, and the eggs remain in sterile condition as they are being delivered onto the collecting belt 18. Of course the sterility of the eggs is extremely important, particularly when the eggs are being used for hatching out additional chicks. When the panel 20 reaches its rearward rest position seen in FIG. 4, the motor 25 will be shut off, and may be controlled by automatic control devices so that its shuts off automatically. It should be recognized that the use of the loose litter containing a disinfectant such as formaldegen in powder form is extremely important to the present invention. Also, the use of the plastic fingers on the articulated comb at the bottom of the pusher panel, together with the arcuately curved concavely shaped bottom panel with the steeply inclined rear portion provides significant advantages as hereinbefore detailed.

What is claimed is:

1. An egg collecting poultry nest comprising,
an enclosure having an open front for access into the enclosure, the enclosure also having a bottom panel with an arcuately curved upwardly facing concave shape, the enclosure also having an opening adjacent a rear edge of the bottom panel over which eggs from the bottom panel are delivered,
egg collecting means at the rear of the enclosure adjacent the rear edge of the bottom panel,
a swingably powered pusher panel in the enclosure and having a lower portion swinging arcuately along the bottom panel toward the open front to push a poultry hen off the nest and alternately swinging away from the open front to move an egg on the arcuate bottom panel rearwardly toward the open rear of the enclosure, the lower portion of the pusher panel defining an articulated comb with stiff fingers extending to the arcuate bottom of the panel for carrying an egg toward the open rear of the enclosure, the articulated comb being tiltable upwardly during swinging of the pusher panel toward the open front to pass over an egg on the bottom panel,
and a quantity of loose litter on the bottom panel and containing a disinfectant to maintain the litter sterile, the litter supporting eggs in the enclosure and allowing the comb fingers to sweep through the litter and along the arcuate bottom panel as eggs in the nest are carried rearwardly by the comb fingers to the rear edge of the bottom panel.

2. The poultry nest according to claim 1 and the stiff fingers of the comb being yieldably flexible.

3. The poultry nest according to claim 1 and the arcuate bottom panel having a steeply inclined portion adjacent the rear edge.

4. The poultry nest according to claim 1 and the pusher panel having electrical electrodes on the face thereof to swing against and touch the poultry hen to encourage the hen to move out of the open front of the enclosure.

5. The poultry nest according to claim 1 and the egg collecting means including a traveling belt adjacent the rear edge of the bottom panel.

6. An egg collecting poultry nest comprising,
an enclosure having an open front for access into the enclosure, the enclosure also having a bottom panel with an upwardly facing concave shape,
a swingably powered pusher panel with an upper edge swingably mounted on the enclosure and a lower portion swinging along the concave bottom panel toward the open front to push a poultry hen off the nest and alternately swinging away from the open front to move an egg rearwardly on the bottom panel, the lower portion of the pusher panel defining an articulated comb with stiff depending fingers extending to the bottom panel for carrying an egg toward the open rear of the enclosure, the articulated comb being tiltable upwardly during swinging of the pusher panel toward the open front to pass over an egg on the bottom panel.

7. The poultry nest according to claim 6 and including a quantity of loose litter on the concave bottom panel and containing a disinfectant to maintain the litter sterile, the litter supporting eggs in the enclosure and allowing the comb fingers to sweep through the litter and across the bottom panel.

* * * * *